Feb. 22, 1927.
H. W. HENRY
BEARING
Filed Oct. 21, 1922
1,618,877
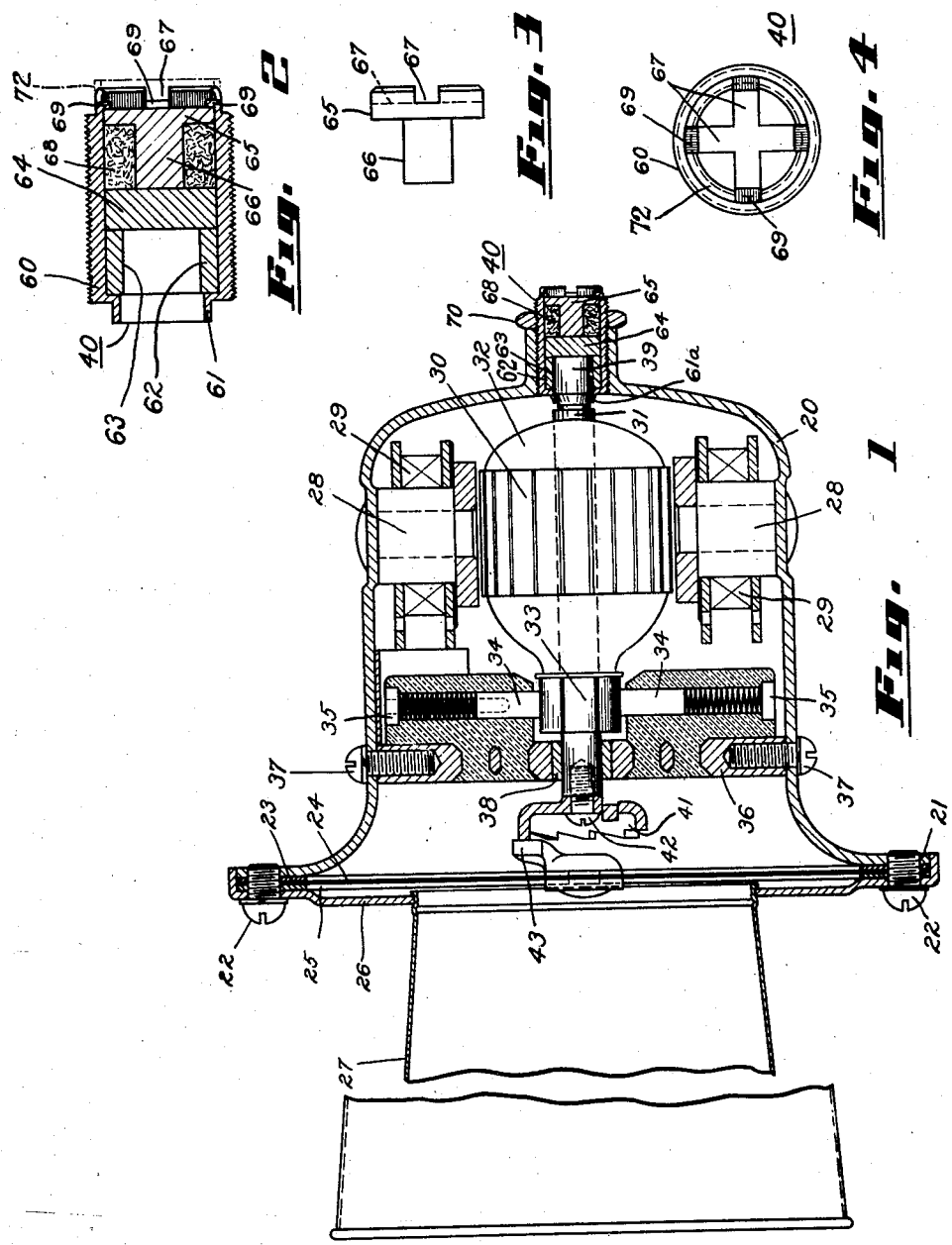

Patented Feb. 22, 1927.

1,618,877

UNITED STATES PATENT OFFICE.

HOWARD W. HENRY, OF DAYTON, OHIO, ASSIGNOR TO GENERAL MOTORS RESEARCH CORPORATION, OF DAYTON, OHIO, A CORPORATION OF DELAWARE.

BEARING.

Application filed October 21, 1922. Serial No. 596,130.

This invention relates to self lubricating bearings particularly for shafts and the like, and the invention has among its objects the provision of a bearing which will remain self lubricating practically for the life of the bearing, meaning until such a time as the bearing surface shall have been worn in normal use so that it should be replaced.

For the purposes of illustration the present invention is embodied in an automobile horn operated by an electric motor, but it is to be understood that the invention is capable of many other uses and is not to be limited to bearings for small motors, such as illustrated.

Further objects and advantages of the present invention will be apparent from the following description, reference being had to the accompanying drawings, wherein preferred forms of embodiment of the present invention are clearly shown.

In the drawings:

Fig. 1 is a sectional view of a motor driven automobile horn to which two embodiments of the invention are applied.

Fig. 2 is a sectional view of one of the motor shaft bearings, on an enlarged scale form shown in Fig. 1, and before the bearing has been attached to the horn motor shaft.

Fig. 3 is a side view of a plug forming a part of the bearing assembly.

Fig. 4 is an end view of the bearing shown in Fig. 2.

In the drawings, the cup-shaped motor frame 20 is provided with flange 21 to which is attached by means of screws 22 the packing washer 23, a diaphragm 24, a second packing washer 25 and a horn frame 26 carrying the horn 27. The frame 20 carries pole pieces 28 which are surrounded by the field magnet windings 29. An armature 30 mounted on a shaft 31 rotates between the poles 28. The armature includes windings 32 attached to a commutator 33 against which bear brushes 34 mounted on the non-conducting brush holders 35 which are preferably constructed of bakelite moulded in place upon a bearing frame 36. This frame is secured in place by means of screws 37 and carries a bearing 38 of oil absorbing metal within which is journalled the shaft 31, the rear end 39 of the shaft 31 being journalled within a self lubricating bearing designated as a whole by numeral 40.

The front end of the shaft 31 carries a ratchet 41 secured in place by screws 42 and adapted to engage a lug 43 riveted to the diaphragm 24. There are the usual circuit connections for a series motor connecting the brushes 34 and the field windings 29.

As is well known in the art, rotation of the motor shaft 31 will effect the vibration of the diaphragm 24 with sufficient rapidity to produce a sound.

It is apparent that to provide a device of this character with a bearing which will remain self lubricating and will retain its bearing qualities for a time at least equal to the life of the horn, is highly desirable. It is equally desirable that these bearings shall not allow an excessive amount of oil to come in contact with the motor shaft, otherwise the operation of the motor and electric circuits might be interfered with. To accomplish these aims the specially constructed self lubricating bearings 38 and 40 of porous oil absorbing metal have been provided. The material for these bearings is of the type described and claimed in the copending applications of Harry Williams, Serial No. 546,478, filed March 24, 1922, and Williams & Boegehold, Serial No. 582,550, filed August 17, 1922.

The bearing 40 includes a tubular shell 60 having threaded engagement with the motor frame 20 for purposes of adjustment. The shell 60 is provided with an annular flange 61 which is formed initially as shown in Fig. 2, and with a flange 72 which is formed initially as indicated by the dot and dash line at the right of Fig. 2. A bushing 62 of porous bearing metal is finished so as to make a press fit within the shell 60. The bearing surface 63 of the bushing 62 is finished by a broaching operation during which the shell 60 is located within the fixture which maintains the broach concentric to the shell.

After the shell has been provided with a bushing 62 the assembly is impregnated with oil by soaking in a bath of oil at about 180° F. for about 12 hours, the bath being allowed to cool before the bearing is removed. A disc or button 64 of bearing material similar to the bushing 63 is inserted within the shell 60. This button 64 need not be separately moulded but it can be cut from a rod of the required diameter by means of a cutting wheel formed preferably of hard rubber and impregnated with diamond dust. Before introducing into the shell 60, the button 64 is impregnated with oil in the manner described.

A plug 65 having a shank 66 and cross grooves 67 across its outer face is placed preferably in an inverted position and a felt washer 68 is placed around the shank 66 and is saturated with oil. The shell 60 containing bearing parts 63 and 64 is lowered upon the plug, and then the flange 72 is spun over the outer face of the plug to secure it in position shown in Fig. 2 and to make practically an oil tight joint between the head of the plug 65 and the shell 60. The shell flange 72 is staked down into the grooves 67 as shown at 69 in Figs. 2 and 4.

The bearing 40 is screwed into the motor frame 20 and is attached to shaft 31 by spinning the flange 61 into a bevelled groove formed adjacent the end 39 of shaft 31. The deformed flange is shown at 61ª in Fig. 1.

The cross grooves 67 in the plug provide for the application of a screw driver by which the bearing 40 may be turned and shifted toward or from the diaphragm 24 to regulate the horn. A lock nut 70 secures the bearing 40 in adjusted position.

It is believed that the felt washer acts as an oil reservoir which supplies oil to the outer surface of the bearing button 64 as needed. As lubricant in bearing 63 is consumed, oil is attracted by it, by force of capillary attraction, from the button 64. As the oil stored in button 64 is absorbed, it attracts the oil which is supplied to its outer surface by the oil absorbing material such as the felt washer 68. Obviously some oil will be fed directly to the end of the shaft by the button 64 and this oil will creep onto the cylindrical surface of the shaft. If the bearing parts 63 and 64 were made integral, the oil feeding action would be substantially the same as described.

It is apparent that a system of bearing lubrication has been provided in which a wick of relatively high oil absorbing capacity feeds oil to a wick of relatively lower oil absorbing capacity whenever the absorbing power of the second wick is greater than that of the first wick, or in other words, when the degree of saturation of the second wick falls below that of the first wick. The second wick is the bearing material itself. As oil is consumed at the bearing surface, the bearing material wick becomes emptied of some of its oil and its degree of saturation falls below reservoir saturation. The oil absorbing power of the bearing is then greater than that of the felt wick, hence the oil flows from the felt wick into the bearing because of the tendency to flow from a point of higher saturation to a point of lower saturation. This flow will continue until a balance is established between the degree of saturation of the bearing material wick and the fibrous material wick.

When a definite metallurgical process is employed to provide porous bearing material, the character of the material can be so controlled that when the bearing material has absorbed lubricant to its full capacity, the correct amount of lubricant will be supplied to the bearing surface. Since the oil capacity of the bearing material is limited to less than that required for the normal life of the bearing, the bearing material wick is backed up by another wick having high oil absorbing capacity, namely by a wick of felt or other fibrous material which will absorb several times its own weight in oil. As long as the bearing material is "wet", that is, has absorbed oil until the balance referred to is established no more oil will be drawn from the storage reservoir.

The bearing material has the property of retaining its full quota of oil, until the shaft wipes some oil off from the bearing surface. The supply to the shaft is limited by what it can wipe off, therefore the shaft will not receive an excess supply such as to cause oil throwing at the ends of the bearing. Therefore this self contained system of bearing lubrication will supply the necessary lubricant for a long period of time, even in excess of the life of the bearing surface.

While the form of mechanism herein shown and described, constitutes a preferred form of embodiment of the present invention, it is to be understood that other forms might be adopted, all coming within the scope of the claims which follow.

What I claim is as follows:

1. A shaft bearing comprising, in combination, a tube, a bearing of porous metal retained within the tube, and a fibrous body of greater oil absorbing capacity than the bearing metal retained within the tube in contact with the bearing metal.

2. A shaft bearing comprising in combination a shell; a bushing adjacent one end of said shell; a plug adjacent the other end of the shell; a disc of porous metal in said shell, interposed between the bushing and plug and partitioning the shell to provide a chamber between the plug and disc; and a lubricant containing member in said chamber adapted to provide lubricant to be absorbed by the disc and transferred to the bushing.

3. A shaft bearing comprising in combination, a shell; a disc of porous bearing material provided in said shell, intermediate the ends thereof, so as to provide a partition therein; a plug including a head portion closing the one end of the shell, and a shank portion spaced from the walls of the shell and engaging the disc; a lubricant containing member in the space about the shank portion of the plug; and a bushing for receiving a shaft, provided in the shell on the side of the disc opposite the plug.

4. A shaft bearing comprising in combination, a shell; a disc of porous bearing material provided in said shell, intermediate the ends thereof, so as to provide a partition therein; a plug including a head portion closing the one end of the shell, and a shank portion spaced from the walls of the shell and engaging the disc; a lubricant containing member in the space about the shank portion of the plug; and a porous metal bushing for receiving a shaft, provided in the shell on the side of the disc opposite the plug, one edge of said bushing engaging with the disc.

5. A shaft bearing comprising in combination, a shell having at one end thereof an opening less in diameter than the bore of the shell said opening being defined by an annular shoulder extending inwardly at this end of the shell; a porous metal disc forming an end thrust bearing in said shell, intermediate the ends thereof, and providing a partition therein; a porous metal bushing interposed between the annular shoulder of the shell and the disc, one end of said bushing engaging the disc; means for plugging the other end of the shell and holding the disc in engagement with the bushing, said means providing a space between the plug and the disc; and a lubricant containing member in said space.

6. A shaft bearing insertable in a housing comprising in combination a shell having screw threads provided on its outer surface; an annular bearing of porous metal in said shell; an end thrust bearing disc of porous metal in said shell, and engaging the end of the annular bearing said disc forming a partition in the shell intermediate the ends thereof; a plug closing the one end of the shell and provided with an extension engaging the end thrust bearing disc, said extension being of lesser transverse dimension than the inner diameter of the shell so as to provide a space in said shell, between the head of the plug and the end thrust bearing disc; and a lubricant containing member in said space.

In testimony whereof I hereto affix my signature.

HOWARD W. HENRY.